United States Patent

Beispel

[15] 3,644,040
[45] Feb. 22, 1972

[54] APPARATUS FOR CONTINUOUS CONTACT PRINTING

[72] Inventor: Robert Beispel, Westlake Village, Calif.
[73] Assignee: Extek Microsystems, Inc., Van Nuys, Calif.
[22] Filed: Aug. 7, 1969
[21] Appl. No.: 848,201

[52] U.S. Cl. .................................. 355/103, 355/91, 355/94
[51] Int. Cl. ..................................................... G03b 27/10
[58] Field of Search ............................. 355/103, 91, 94, 87

[56] References Cited

UNITED STATES PATENTS 3,468,606  9/1969  Wolf et al. ........................... 355/94 X

*Primary Examiner*—Samuel S. Matthews
*Assistant Examiner*—Richard L. Moses

[57] ABSTRACT

An apparatus for continuous contact printing from an image-bearing master transparent film to a continuous duplicate or light-sensitive strip of material, including, a frame carrying the master and duplicate on supply and takeup reels including means for driving such reels, a light source for exposing the duplicate when the master and duplicate are in an exposure zone, and means for positioning the master and duplicate during continuous movement of such master and duplicate including vacuum means for guiding and initially compressing the master and duplicate together and further vacuum means for maintaining the master and duplicate in registry during movement through the exposure zone. The duplicate and master have substantially no relative difference in speed and may also be laterally aligned so as to closely and accurately control the positioning of the master and duplicate with respect to one another.

9 Claims, 11 Drawing Figures

INVENTOR.
ROBERT BEISPEL

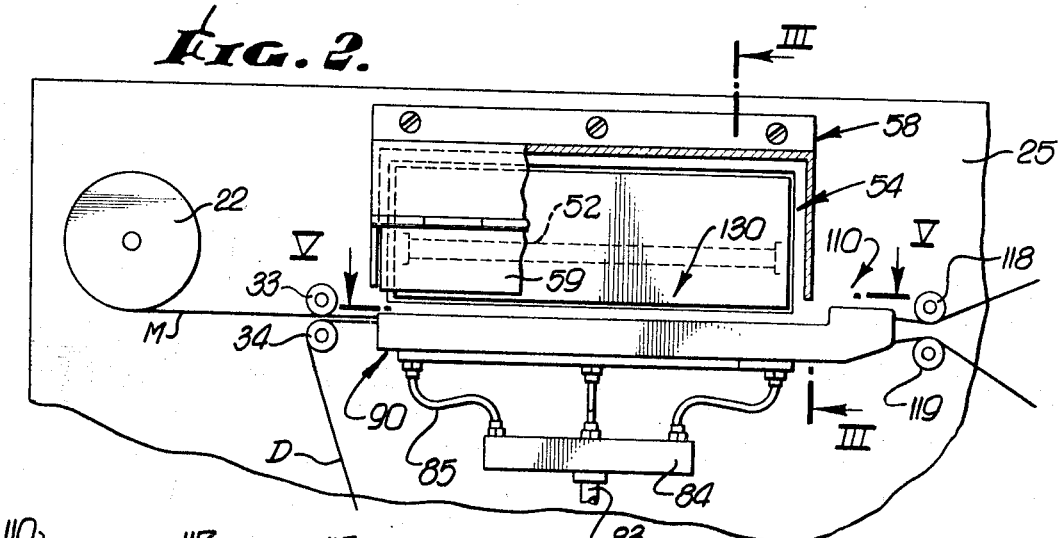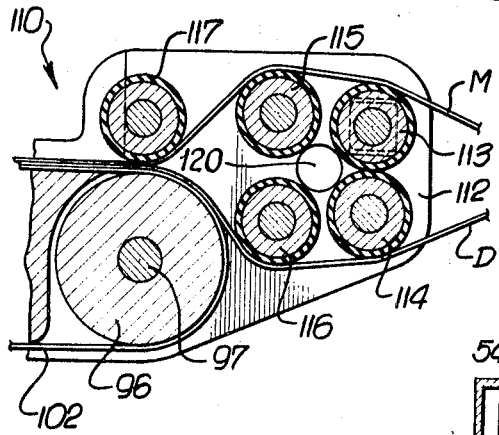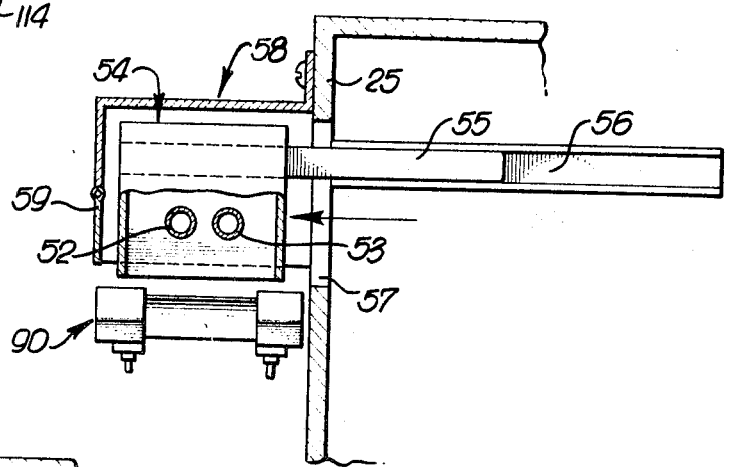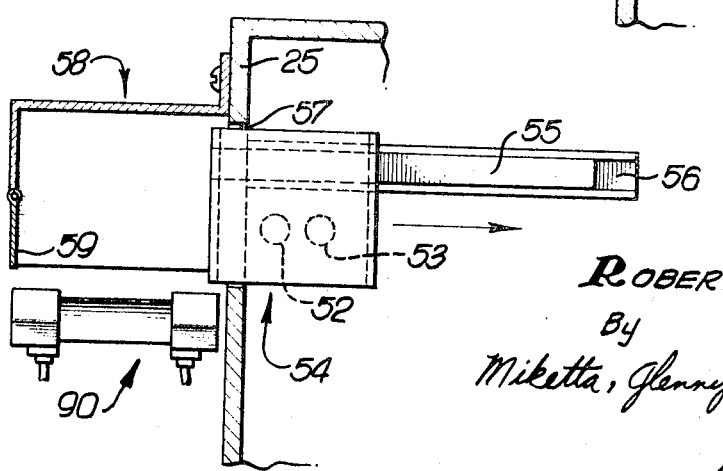

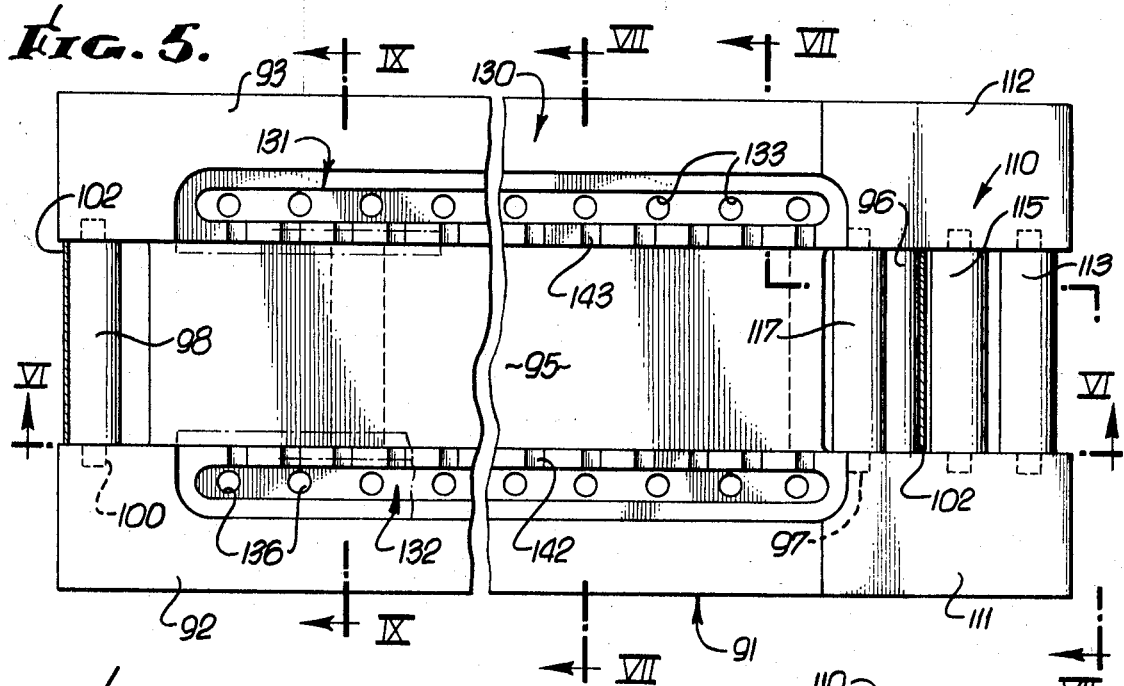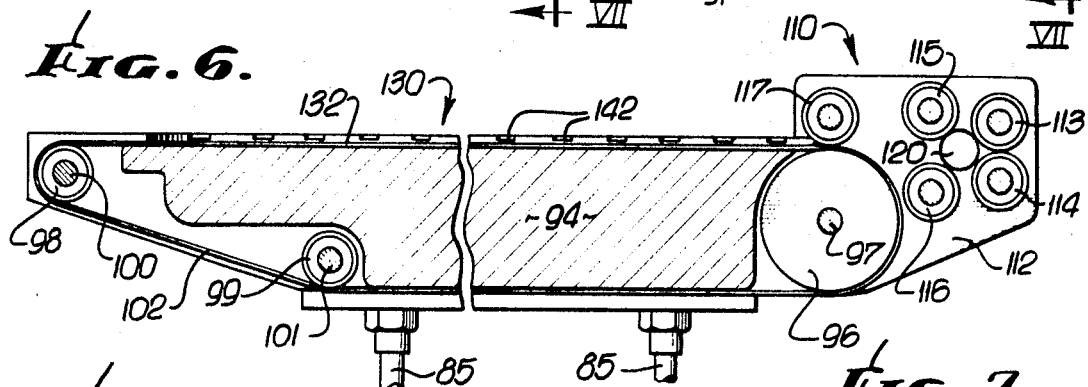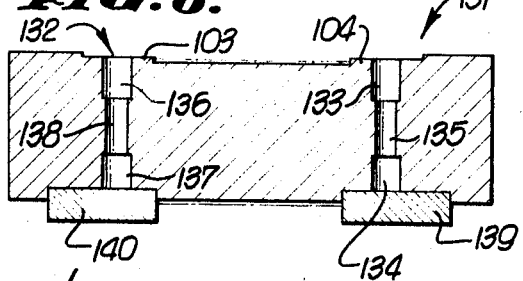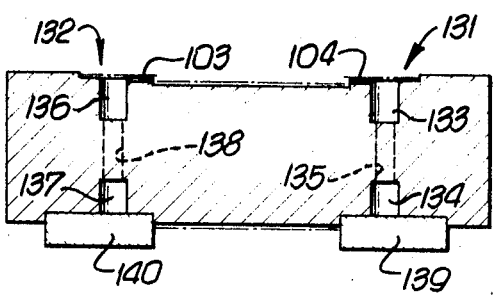

APPARATUS FOR CONTINUOUS CONTACT PRINTING

BACKGROUND OF THE INVENTION

This invention generally relates to continuous contact printing and more particularly printing from an image-bearing master transparent film onto a light-sensitive web or strip duplicate for receiving such image. For purposes of convenience and description, the term duplicate will be used hereinafter to refer to the light-sensitive strip of material for receiving such image.

The apparatus of the present invention is particularly directed to contact printing where the master and duplicate are exposed to a high-intensity light source in a zone for an appreciable period of time. Under such circumstances, it will be apparent that extreme accuracy in registry or positioning must be maintained including virtually no relative movement between the master and duplicate.

It has been suggested in the prior art that a vacuum source may be used to maintain registry during contact printing. For example, in U.S. Pat. No. 2,408,310, a contact printing apparatus is disclosed in which a master or original transparency and a "film" are enclosed between transparent belts of wider dimensions, the edges of the belts engaging elongated vacuum sources disposed longitudinally adjacent the belts and in fluid communication with the space enclosed by the belts so as to create a vacuum therebetween maintaining the belts, film, and master in registry. The disadvantage of such apparatus is the possibility of scratching of the belts or the introduction of dust or other particles between or carried by the belts, since the exposure is made through the belts. In use with high resolution film, the image character may be almost the size of dust particles which would seriously degrade the resultant image. Moreover, the master and duplicate are manufactured by slitting strips from larger pieces so that the side edges are neither parallel, or if parallel, then not linear. Thus, the master and/or duplicate will "track" which precludes continuous registry without physical side edge control. No such control is possible, however, in the apparatus disclosed in U.S. Pat. No. 2,408,310.

It has also been proposed in copending applications relating to contact printing devices, invented by myself and Margery Wolf, Ser. No. 501,029, filed Oct. 22, 1965, and Ser. No. 696,357 now U.S. Pat. No. 3,468,606, filed Jan. 8, 1968, to use a vacuum chamber bed. Such bed has an atmospheric pressure box with a foraminous upper surface, vertically supported in said bed under upward spring bias against a master and duplicate moving thereabove, the edges being exposed to vacuum so as to be drawn together and maintained in registry. However, while such apparatus perform satisfactorily for certain types of film, more precise registry is required for slow moving, high resolution contact printing such as when using emulsions requiring high active light energy.

Accordingly, it is an object of the present invention to provide an apparatus which maintains extremely accurate registry between continuous transparent image-bearing film master and a continuous light-sensitive duplicate, during continuous contact printing. Also, it is an object to provide accurate edge control to maintain lateral registry of the master and duplicate and to use a vacuum source to preclude relative longitudinal movement of the master and duplicate. The invention is also intended to permit use of high resolution master and duplicate and a high-intensity movable light source to preclude damage of the master when it is maintained in a stationary position relative to a moving duplicate.

SUMMARY OF THE INVENTION

Generally stated, the present invention provides in an apparatus for contact printing from an image-bearing master to a strip duplicate of substantially equal width, having a frame, takeup and supply spools or reels for the duplicate and master and means for moving the master and duplicate, a light source for exposing the duplicate to the master when in an exposure zone, means for registering the master and duplicate during continuous movement of such master and duplicate including vacuum means compressing the film and duplicate together so that there is substantially no relative difference in speed between the master and duplicate.

BRIEF DESCRIPTION OF THE DRAWINGS

FIG. 2 is a front elevation view of a portion of the apparatus diagrammatically shown in FIG. 1;

FIG. 3 is a section view taken along the plane III—III of FIG. 2;

FIG. 4 is a view as in FIG. 3 showing the movable light source in a second position;

FIG. 5 is a section view taken along the plane V—V of FIG. 2;

FIG. 6 is a section view taken along the plane VI—VI of FIG. 5;

FIG. 7 is a section view taken along the plane VII—VII of FIG. 5;

FIG. 8 is a section view taken along the plane VIII—VIII of FIG. 5;

FIG. 9 is a section view taken along the plane IX—IX of FIG. 5;

FIG. 10 is a detailed partial section view of a portion of the exposure bed shown in FIG. 5.

DETAILED DESCRIPTION OF THE PREFERRED EMBODIMENT

Figure 1:
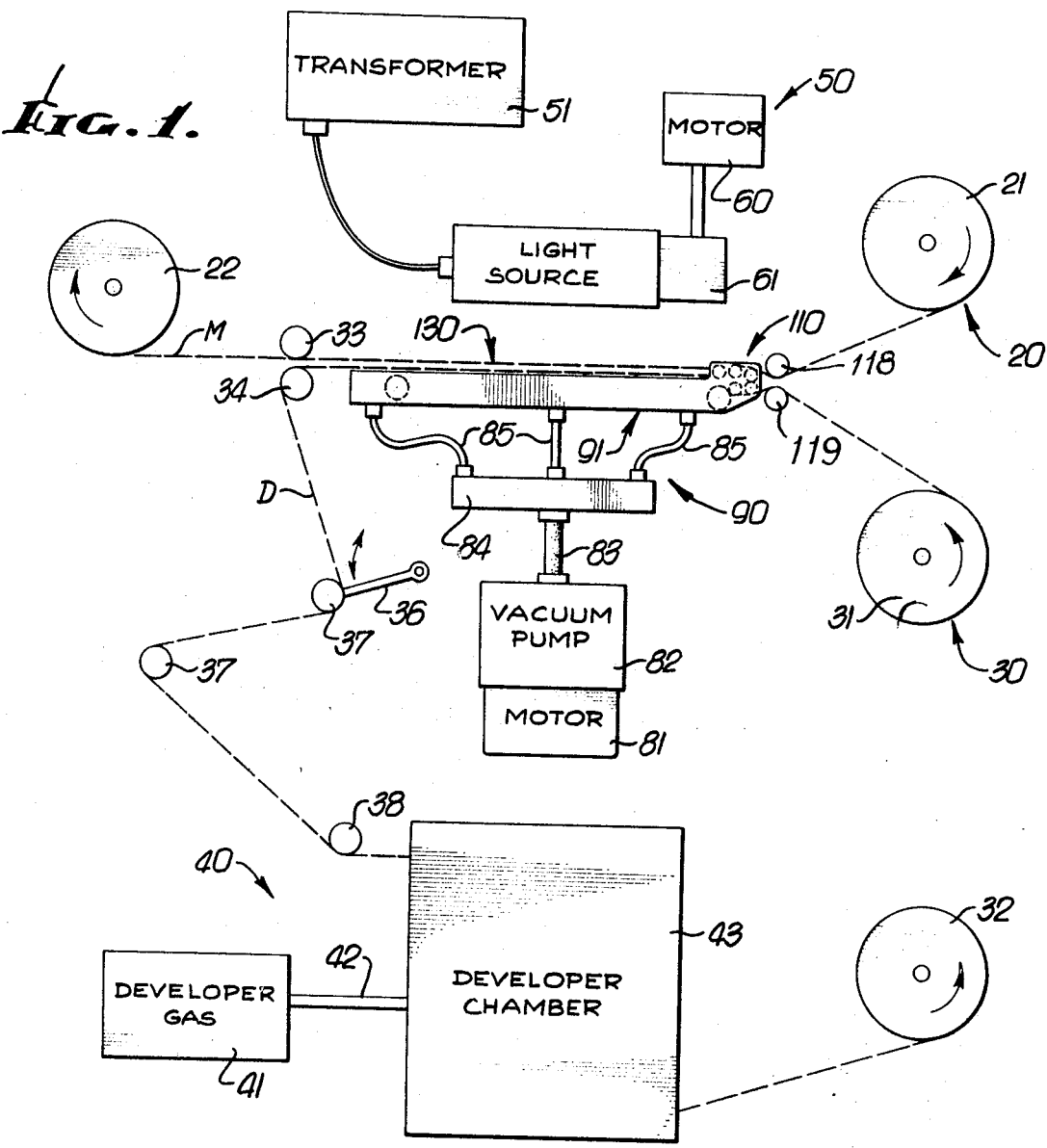
FIG. 1 is a diagrammatic view of an exemplary embodiment of an apparatus constructed in accordance with the present invention.

Referring now to FIG. 1, there is diagrammatically shown an exemplary embodiment of a continuous contact printing apparatus for copying an image on a transparent master to a slow-speed duplicate. Generally, the apparatus comprises supply and takeup reels for the image-bearing transparent master, indicated generally at 20; supply and takeup reels for the light-sensitive continuous duplicate, indicated generally at 30; means 40 for developing the exposed duplicate; a light source, indicated generally at 50; a vacuum source indicated generally at 80; means for registering the master and duplicate during continuous movement thereof, indicated generally at 90, including entrance vacuum means 110 for initially vacuum compressing the master and duplicate in registry and vacuum means 130 for maintaining the master and duplicate in registry during movement through said exposure zone. The image-bearing master is indicated at M and the duplicate at D.

With continued reference to FIG. 1, the reels indicated generally at 20 for the master M include a supply reel 21 and takeup reel 22 rotatably mounted on axles supported by a frame 25. The reels indicated generally at 30 for the duplicate D include the supply reel 31 and the takeup reel 32. Means is provided for moving said master and duplicate which in the exemplary embodiment comprises a pair of closely spaced motor driven capstans 33, 34, the surfaces of which are provided with a high friction material for engaging the master and duplicate and which are biased toward one another so as to create a nip to firmly frictionally engage the master and duplicate passing therebetween to provide continuous movement of the master and duplicate. In the exemplary embodiment, the duplicate D is passed through developing means 40 and is withdrawn therefrom by driving the takeup reel 32, by a motor or the like. The speed of duplicate takeup reel 32 may therefore increase or decrease during operation of the apparatus due to differences in the driving speed of the capstans and the takeup reel 32. Accordingly, there is provided a slack takeup device including a roller 35 mounted on an arm 36 pivotally mounted to the frame and responsive to the speed of rotation of the takeup reel 32 so as to pivot in response thereto thereby assuring that the duplicate portion D remains in tension. There is also mounted on the frame, idle rollers 37, 38 about which the duplicate D portion is guided prior to entry into the developing means. It will of course be understood that the developing means may be entirely separate from the apparatus of the present invention and the duplicate may be wound and later developed on a second apparatus, i.e., the development need not be continuous.

As indicated above, the apparatus of the present invention is particularly adapted for the use with film, such as diazo, used as the duplicate. The exposed diazo duplicate is developed through means 40 which may comprise a developer gas, such as Ammonium, in a container 41 connected through a line 42 to a developer chamber 43. Such developer chamber includes a plurality of rollers (not shown) around which the exposed duplicate is festooned and is exposed to the developer gas which is dispersed throughout the chamber. The development of such diazo film being well known in the art, no further description is believed necessary.

The apparatus also includes a light source 50 which may include a transformer 51 and high intensity bulbs such as elongated cylindrical bulbs 52, 53 (See FIGS. 2 through 4) mounted in a movable housing 54. The housing 54 includes top, end and sidewalls and provides light through the bottom opening which may be positioned above portions of the master M and duplicate D. The movable light source housing 54 is supported by arms 55 which are slidably movably mounted in track members 56 supported by frame 25. Frame 25 is provided with a suitable opening 57 so that the movable light source housing 54 may move through such opening from a position behind the frame 25 to an exposure position above exposure bed 90 as seen in FIG. 4. The light source also includes a fixed housing indicated generally at 58 for receiving the movable housing 54 when in the exposure position. The front wall of the fixed housing 58 is provided with a lower pivotally mounted door portion 59 to permit access. A motor 60 and suitable drive linkage indicated at 61 in FIG. 1, are provided for moving the light source movable housing 54 into the exposure position during operation of the apparatus and movement out of the exposure position when the device is not operating such as when a new master M the duplicate D are being threaded from the supply reels through the exposure zone to the takeup reels.

The exemplary embodiment of the apparatus of the present invention also includes the vacuum source 80 comprising a motor 81 and vacuum pump 82 in fluid communication through a line 83 to a vacuum manifold 84 having a plurality of vacuum lines 85 for distribution of the vacuum.

Means 90 for registering the master and duplicate during continuous movement thereof in the exemplary embodiment includes an exposure bed or body 91 fixedly carried by the frame 25 immediately below the light source. The exposure bed, as seen best in FIGS. 5 through 10, comprises longitudinally extending side portions 92, 93 and a longitudinally shorter center portion 94, as seen best in FIG. 6. The center portion 94 has an upper surface 95 which is recessed below the upper surface of the side portions 92, 93. Exposure bed 91 may be cooled by circulating a coolant through suitably provided passages in the side and center portions thereof.

The exposure bed 91 also includes support means which comprises a large roller 96 rotatably mounted on an axle 97 supported between side portions 92, 93 at the entrance end of the bed. A smaller roller 98 is rotatably mounted on an axle 100 at the opposite or exit end of the bed, and a guide roller 99 is rotatably mounted on an axle 101 in a recessed portion on the undersurface of the bed. The rollers 96, 98 are disposed such that the upper surface 95 of the bed center portion 94 is substantially coplanar with the upper surface of the cylindrical rollers. As seen best in FIG. 6, an endless support belt is mounted for movement around rollers 96, 98 and 99. The upper lay of support belt 102 lies upon the upper surface 95 of the center portion 94 of the exposure bed. Of course, the support belt moves with the moving master and duplicate so as to minimize sliding contact which could scratch the lower work material, i.e., the duplicate. One of the rollers may be power driven so that the belt 102 is moved at the same speed as the master and duplicate or the belt may be driven by frictional engagement with the duplicate. The support belt 102 may be constructed of a material identical to the material of the master M or duplicate D. Such support belt may have a width equal to the width of the master and duplicate strips.

Figure 11:
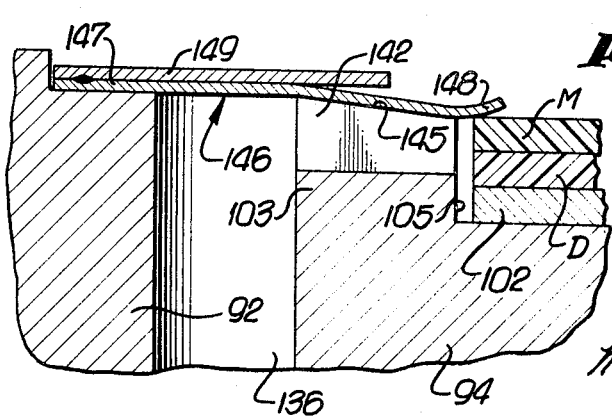
FIG. 11 is a detailed view taken along the plane XI—XI of FIG. 10.

The body 91 of the exposure bed defines a pair of longitudinally extending guide walls 103, 104 laterally adjacent the recessed center portion which receives the moving master and duplicate, as seen best in FIG. 9. The edges of the master M, duplicate D, and support belt 102 are laterally adjacent and restrained by the walls 103, 104. The walls 103, 104 prevent the master, duplicate and support belt from tracking by reason of the physical engagement of the edges of these elements with the inner face of the walls, such as face 105 as seen in FIG. 11.

The means 90 also includes vacuum means for compressing the master and duplicate to maintain these continuous strips in registry. In the exemplary embodiment, such vacuum means comprises entrance vacuum means 110 for guiding and initially positioning the master and duplicate in registry and vacuum means 130 for maintaining the master and duplicate in registry throughout movement through the exposure zone which is here shown as planar.

Entrance vacuum means 110 includes extended wall sections 111, 112 integral with bedside portions 92, 93, respectively, at the forward or entry end of bed 90. As seen best in FIG. 10, means 110 comprises means having a movable surface in sealing engagement with said movable master and duplicate along a continuous line contact between said sidewalls. The movable surface means may comprise roller means, which in the exemplary embodiment includes a pair of rollers 113, 114 disposed in a vertical plane and supported between wall extensions 111, 112. Roller 113 may be vertically adjustable so that the rollers 113, 114 are in interference engagement and airtight contact. A second pair of rollers 115, 116 are positioned in a vertical plane spaced apart from the first pair of rollers toward the exposure zone. A further roller 117 is also supported between the sidewall extensions 111, 112 and is vertically aligned above support belt roller 96. All of the rollers extend between the sidewalls in close proximity to the side surfaces and each is provided with a nonslip surface. As seen generally in FIGS. 1 and 2, and in detail in the enlarged showing of FIG. 10, master M and duplicate D are drawn from supply rolls 21, 31 and passed between idler rollers 118, 119, around the outside of rollers 113, 114, 115 and 116 and between the rollers 117 and 96. It will thus be seen that the master and duplicate when threaded through the apparatus to the takeup reels will form a vacuum chamber at the forward or entry end of the exposure bed defined by the sidewall extensions 111, 112, the inner surfaces of the master and duplicate, and the rollers 113, 114 which are in sealing line contact with the master and duplicate and with one another. Of course, the forward end of the chamber is closed since the exteriorly disposed rollers 117, 96 are in closely spaced-apart relation so as to force the master and duplicate into sealing engagement. To initially establish the vacuum registry of the master and duplicate, the vacuum chamber is provided with an opening 120 in at least one of the sidewalls extensions 111, 112 so as to evacuate the air from between the master and duplicate as they are guided in a convergent path onto exposure bed 91.

The vacuum means 130 for maintaining the master and duplicate in longitudinal registry during movement thereof through the planar exposure zone includes a pair of longitudinally extending vacuum channels, indicated generally at 131, 132, formed in the body 91 of the exposure bed. Vacuum channel 131 includes an upper channel portion 133, as seen best in FIGS. 7 through 9, a lower channel portion 134, and a plurality of longitudinally spaced openings 135 (see FIGS. 8 and 9) interconnecting the channel portions 133, 134. Similarly, vacuum channel 132 includes an upper channel portion 136, a lower channel portion 137, and longitudinally spaced communicating openings 138. The lower vacuum channel portions 134, 137 are closed by elongated plates 139, 140 which are provided with openings for receiving fittings indicated generally at 141 connected to the ends of vacuum line 85. It will therefore be apparent that the entire vacuum channels 131, 132 will be evacuated when the motor 81 and vacuum pump 82 are in operation. The vacuum is communicated from the upper channel portions 133, 136 to the master, duplicate and support belt 102 through a plurality of transverse openings such as notches 142, 143 in the top surface of walls 103, 104, in exposure bed body portions 92, 93, respectively.

With attention now drawn to FIG. 11, it will be seen that the upper surface 145 of the wall 103 is flat and slopes inwardly and downwardly. The lower edge of the upper surface 145 of wall 103 is approximately in the same horizontal plane as the upper surface of the edge of master M. It will be readily appreciated that the vacuum in the vacuum channel including the upper vacuum channel portion 136 will communicate through the notches 142 into the space between the inner surface 105 of the wall 103 and the edges of the master, duplicate and support belt 102. Thus, air between these strips will be drawn laterally outwardly through the edges of these members so that they are vacuum compressed and held in registry.

In the exemplary embodiment of the apparatus, there is also provided means for sealing the vacuum channels, notches, master, duplicate and support belt edges so as to facilitate vacuum compression of the latter three members. Such means may comprise a lightweight resilient flexible extremely thin elongated sheet 146 supported along one longitudinal edge 147 from a recessed portion of the side body portion 93. As seen best in FIG. 11, the sheet overlies the channel 136, the wall 103 including the notches 142 therein, and the space between the inner surface 105 of the wall 103 and the edges of the master, duplicate and support belt. Preferably, the longitudinal edge 148 of the sheet 146 slightly overlies the longitudinal edge of the master portion which is positioned on the exposure bed. To maintain the sheet 146 relative to the body of the vacuum means, there is provided a guide plate 149 which may have a length substantially equal to the length of sheet 146 and overlies such sheet and is attached as by welding or the like along the longitudinal edge 147 of the sheet 146. Since guide plate 149 has a lesser transverse dimension than sheet 146, it will be seen that the free longitudinal edge portion 148 of the sheet is free to conform to the upper surface of the notched wall of the body and to the thickness of the master, duplicate and support belts which it overlies. However, excessive upward movement of the free longitudinal edge 148 of the sheet is constrained by the guide plate 149.

In operation, the image-bearing master M is mounted on the supply reel 20 and is threaded below roller 118, above rollers 113, 115, below roller 117, and across the recessed central portion 94 of the exposure bed so as to rest upon support belt 102 and further between the capstans 33, 34 and secured, in a well-known manner, to takeup reel 22. Similarly, the duplicate is passed above the roller 119, below rollers 114, 116, and above roller 96 so as to rest on the support belt 102 and across the exposure bed. The duplicate end continues between the capstans 33, 34 around the slack takeup mechanism and idler rollers 37, 38 through the developer chamber 43 and secured to the takeup reel 32. The nip between the motor driven capstans 33, 34 is sufficient to permit the film to be pulled through the exposure zone.

To commence operation, the developer chamber is placed in operation, the light source is energized, and the motor 81 is started to operate vacuum pump 82 so as to provide vacuum to longitudinal channels 131, 132 and to the vacuum port 120. As the master and duplicate are driven across the exposure bed 91, the movable light source 50 is position above exposure bed 91 so as to expose the duplicate to the image-bearing master whereupon the exposed duplicate is developed. Lateral guiding is maintained through the walls 103, 104 of the exposure bed body 91 while registry is maintained by initially compressing the master and duplicate together by evacuating the converging space therebetween through the vacuum port 120 and thereafter maintaining the master and duplicate in compression by evacuating the space therebetween through the vacuum channels and notches which communicate with the edges of such master and duplicate. The master and duplicate are also compressed with the support belt 102 which moves in registry with the master and duplicate so as to provide movable and driving support thereof.

From the above description of the structure and operation of the present apparatus, it will be seen that there is provided means for contact printing which employs an elongated preferably planar exposure zone which permits the use of an elongated light source and an extended exposure dwell period. The precise registry which must be maintained during such elongated exposure of the duplicate is performed by the vacuum means which guides and initially compresses the master and duplicate together and thereafter maintains such compression throughout the exposure zone. Thus, while the invention has been described in detail with particular reference to a preferred embodiment thereof, it will be understood that variations and modifications can be effected within the spirit and scope of the invention as described hereinabove.

What is claimed is:

1. In an apparatus for copying of transparent film images from a master to a strip duplicate comprising a frame carrying said master and said duplicate on supply and takeup reels, means for moving said master and duplicate, a light source for exposing said duplicate when said master and duplicate are in an exposure zone, the provision of:

means for positioning said master with respect to said duplicate during continuous movement of said master and duplicate including entrance vacuum means for compressing said master and duplicate in registry comprising a vacuum chamber defined by sidewalls, means having a movable surface in sealing engagement with said movable master and duplicate along a continuous line of contact between said sidewalls, and said master and duplicate, and at least one vacuum port in communication with said vacuum chamber for evacuation thereof whereby atmospheric pressure forces said moving master and duplicate together.

2. The provision of claim 1 wherein said vacuum means additionally comprises means for maintaining vacuum compression of said master and duplicate throughout said exposure zone.

3. The provision of claim 2 wherein said vacuum means for maintaining said master and duplicate in vacuum compression throughout said exposure zone comprises longitudinally extending vacuum channels laterally adjacent said master and duplicate edges, a plurality of transverse openings providing fluid communication between said channels and the edges of said master and duplicate, and a longitudinally extending, resilient, thin, highly flexible metallic strip overlying said vacuum channels, transverse notches and edge portions of said master so as to provide a vacuum seal.

4. The provision of claim 3 additionally including means for laterally guiding said master and said duplicate through said exposure zone.

5. The provision of claim 2 including means for supporting said master and duplicate in the exposure zone comprising an endless belt having a width equal to the width of said duplicate and master.

6. The provision of claim 1 wherein said means having a movable surface in sealing engagement with said master and duplicate comprises roller means including a nonslip surface in frictional contact with said master and duplicate.

7. In an apparatus for contact printing of an image upon a moving strip of light-sensitive material from an image-bearing master comprising a frame, takeup and supply means for the continuous light-sensitive material and master strips, means for moving the master and strip of light-sensitive material and a light source for exposing the strip of light-sensitive material to the master image when the master and light-sensitive strips are in an exposure zone, the provision of:

means for positioning said master with respect to said light-sensitive material strip during continuous movement thereof so as to maintain said master and light-sensitive material in precise registry including, entrance vacuum means for guiding said master and strip of light-sensitive material into the exposure zone and compressing said light-sensitive material strip and master in registry including a pair of spaced apart walls, at least two rollers disposed between said master and strip of light-sensitive material in contact engagement with each other and the adjacent surfaces of said master and strip of light-sensitive material, and a second pair of rollers longitudinally spaced toward said exposure zone and positioned exteriorly of said master and strip of light-sensitive material in closely spaced-apart relation so as to effect contact engagement of said master, light-sensitive material and roller surfaces, said sidewalls, rollers, master and light-sensitive material defining a vacuum chamber, and means communicating with said chamber for evacuation thereof.

8. The provision of claim 7 wherein said vacuum means additionally includes means for maintaining said master and strip of light-sensitive material in compressed registry during movement through said exposure zone including an exposure bed having a pair of longitudinally extending guide walls disposed on opposite sides of said master and light-sensitive material strips, a longitudinally extending vacuum channel laterally adjacent each of said guide walls, a plurality of transverse openings through said walls providing fluid communication between said channels and the edges of said master and light-sensitive material, and longitudinally extending means overlying the edge portions of said master so as to provide a vacuum seal, whereby air is laterally withdrawn from between said master and light-sensitive material so as to compress said master and strip of light-sensitive material in registry.

9. In an apparatus for continuous contact printing of an image upon a moving duplicate strip from an image-bearing master comprising a frame, takeup and supply means for the continuous duplicate and master strip, means for moving the master and duplicate, and a light source for exposing the duplicate to the master image when the master and duplicate are in an exposure zone, the provision of:

means for positioning said master with respect to said duplicate during continuous movement thereof so as to maintain said master and duplicate in precise registry including, vacuum means for maintaining said master and duplicate in compressed registry during movement through said exposure zone including an exposure bed having a recessed longitudinally extending center portion for receiving said master and duplicate, longitudinally extending vacuum channels adjacent the side edges of said center portion, a plurality of transverse notches interconnecting said vacuum channels and said recessed center portion, and longitudinally extending flexible means overlying each of said vacuum channels, transverse notches, and the edge portions of said master so as to provide a vacuum seal, whereby air may be withdrawn laterally outwardly from between said master and duplicate through said vacuum channels so as to compress said master and duplicate in registry.

* * * * *